United States Patent
Li (10) Patent No.: US 11,107,135 B2
(45) Date of Patent: Aug. 31, 2021

(54) ASSESSING SHARED VEHICLE POPULARITIES

(71) Applicant: Advanced New Technologies Co., Ltd., Grand Cayman (KY)

(72) Inventor: Jie Li, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 16/827,536

(22) Filed: Mar. 23, 2020

(65) Prior Publication Data

US 2020/0226648 A1    Jul. 16, 2020

Related U.S. Application Data

(63) Continuation of application No. PCT/CN2018/106912, filed on Sep. 21, 2018.

(30) Foreign Application Priority Data

Nov. 20, 2017    (CN) .......................... 201711160929.0

(51) Int. Cl.
*G06Q 30/02* (2012.01)
*G06T 7/90* (2017.01)
(Continued)

(52) U.S. Cl.
CPC ..... *G06Q 30/0282* (2013.01); *G06Q 30/0645* (2013.01); *G06T 7/90* (2017.01);
(Continued)

(58) Field of Classification Search
CPC .. G06Q 50/30; G06Q 10/04; G06Q 10/06393; G06Q 30/0282; G06Q 30/0645;
(Continued)

(56) References Cited

U.S. PATENT DOCUMENTS 6,317,720 B1 * 11/2001 Murakami ............. G06Q 10/02
705/7.22
9,785,897 B2    10/2017 Kishore et al.
(Continued)

FOREIGN PATENT DOCUMENTS

CN    104156618    11/2014
CN    104699792    6/2015
(Continued)

OTHER PUBLICATIONS

X. Han et al., "Bike sharing data analytics for silicon valley in USA," 2017 IEEE Smartworld, Ubiquitous Intelligence & Computing, Advanced & Trusted Computed, Scalable Computing & Communications, Cloud & Big Data Computing, Internet of People and Smart City Innovation, 2017, pp. 1-9 (Year: 2017).*
(Continued)

*Primary Examiner* — Gabrielle A McCormick
*Assistant Examiner* — Maame Ofori-Awuah
(74) *Attorney, Agent, or Firm* — Fish & Richardson P.C.

(57) ABSTRACT

The present specification provides a method for, including: collecting information about respective geographic positions of users using shared vehicles; determining, for each one of the respective geographic positions, popularity indexes of the shared vehicles in an area corresponding to the geographic position; determining, for each one of the respective geographic positions and based on the popularity indexes, a popularity score of the shared vehicles within the area corresponding to the geographic position; mapping the popularity scores to corresponding color values; and generating a presentation of the areas with visual attributes representing the popularity scores of the shared vehicles within the areas, wherein generating the visual presentation comprises rendering the presentation in accordance with the color values.

17 Claims, 3 Drawing Sheets

(51) Int. Cl.
*H04W 4/029* (2018.01)
*G06Q 30/06* (2012.01)
*H04W 4/021* (2018.01)
*H04W 4/02* (2018.01)

(52) U.S. Cl.
CPC ............. *H04W 4/02* (2013.01); *H04W 4/021* (2013.01); *H04W 4/029* (2018.02)

(58) Field of Classification Search
CPC ....... H04W 4/029; H04W 4/021; H04W 4/02; H04W 4/40; G06T 7/90
See application file for complete search history.

(56) References Cited

U.S. PATENT DOCUMENTS

| | | | | |
|---|---|---|---|---|
| 2010/0208988 | A1* | 8/2010 | Zhou | G06T 7/136 382/165 |
| 2015/0302346 | A1 | 10/2015 | Kishore et al. | |
| 2016/0300170 | A1* | 10/2016 | Sun | G06Q 10/06315 |
| 2018/0032920 | A1* | 2/2018 | Ito | G06Q 10/06313 |
| 2018/0032928 | A1 | 2/2018 | Li et al. | |

FOREIGN PATENT DOCUMENTS

| | | |
|---|---|---|
| CN | 106875256 | 6/2017 |
| CN | 106875672 | 6/2017 |
| CN | 106960521 | 7/2017 |
| CN | 106971271 | 7/2017 |
| CN | 107038503 | 8/2017 |
| CN | 107093104 | 8/2017 |
| CN | 107944618 | 4/2018 |
| WO | WO 2016127918 | 8/2016 |

OTHER PUBLICATIONS

Zhou X. "Understanding Spatiotemporal Patterns of Biking Behavior by Analyzing Massive Bike Sharing Data in Chicago." PLoS One. 2015; 10(10):e0137922. Published Oct. 7, 2015. doi:10.1371/journal.pone.0137922 pp. 1-20 (Year: 2015).*
Reiss, Svenja, and Klaus Bogenberger. "A Relocation Strategy for Munich's Bike Sharing System: Combining an operator-based and a user-based Scheme." Transportation Research Procedia 22 (2017): 105-114 (Year: 2017).*
• J. Liu et al., "Station Site Optimization in Bike Sharing Systems," 2015 IEEE International Conference on Data Mining, Atlantic City , NJ, USA, 2015, pp. 883-888, doi: 10.1109/ICDM.2015.99 (Year: 2015).*
PCT Written Opinion of the International Searching Authority in International Application No. PCT/CN2018/106912, dated Nov. 21, 2018, 9 pages (with English translation).
Crosby et al., "BlockChain Technology: Beyond Bitcoin," Sutardja Center for Entrepreneurship & Technology Technical Report, Oct. 16, 2015, 35 pages.
International Search Report and Written Opinion in International Application No. PCT/CN2018/106912, dated Nov. 2, 2018, 11 pages (with partial English translation).
Nakamoto, "Bitcoin: A Peer-to-Peer Electronic Cash System," www.bitcoin.org, 2005, 9 pages.
PCT International Preliminary Report on Patentability in International Application No. PCT/CN2018/106912, dated May 26, 2020, 10 pages (with English translation).

* cited by examiner

ASSESSING SHARED VEHICLE POPULARITIES

CROSS-REFERENCE TO RELATED APPLICATIONS

This application is a continuation of PCT Application No. PCT/CN2018/106912, filed on Sep. 21, 2018, which claims priority to Chinese Patent Application No. 201711160929.0, filed on Nov. 20, 2017, and each application is hereby incorporated by reference in its entirety.

TECHNICAL FIELD

The present specification relates to the field of computer applications, and in particular, to a method for stationing shared vehicles, device, and electronic device.

BACKGROUND

Shared economy is a new economic mode in recent years, which is different from the traditional trading economy. In essence, it is a time-sharing rental economy, in which the shared products are generally distributed to every corner of the market by the companies that provide services for users' discovery and rental. At present, for example, in the field of shared economy, products and services such as shared bicycle, shared mobile power bank, shared umbrella, and shared clothing have emerged.

SUMMARY

The present specification proposes a method for stationing shared vehicles, including: collecting geographical position of a user when a shared vehicle is used; calculating a popularity index of the shared vehicle in a positional area corresponding to each collected geographical position, and calculating popularity score of each positional area based on the index of the shared vehicle; mapping the calculated popularity score of the shared vehicle as a corresponding color value; and generating a visual chart through visual rendering on each positional area based on the color values, where the visual chart is used to plan areas for stationing the shared vehicle.

Optionally, collecting a geographic position of a user when a shared vehicle is used includes: when renting the shared vehicle, adopting the geographic position of the user; and when returning the shared vehicle, collecting the geographic position of the user.

Optionally, the calculating a popularity index of the shared vehicle in a positional area corresponding to each collected geographic position includes: calculating difference values between the quantity of the shared vehicles distributed and the quantity of the shared vehicles leased in each positional area to obtain a first popularity index; calculating the difference values between the quantity of the shared vehicles distributed and the quantity of the shared vehicles returned in each positional area to obtain a second popularity index; and calculating the difference values between the quantity of the shared vehicles leased and the quantity of the shared vehicles returned in each positional area, and taking an absolute value of the difference to obtain a third popularity index.

Optionally, the calculating a popularity score of each positional area based on the popularity index of the shared vehicle includes: mapping the first popularity index, the second popularity index, and the third popularity index to interval [0, 1] separately; and calculating the popularity score of the shared vehicle based on the following equation:

$$L=a*S1+b*S2+c*S3;$$

where L is the popularity score of the shared vehicle; S1 represents the first popularity index that's mapped to interval [0,1]; S2 represents the second popularity index mapped to interval [0,1]; S3 represents the third popularity index mapped to interval [0,1]; a is a weight value corresponding to the first popularity index; b is a weight value corresponding to the second popularity index; c is a weight value corresponding to the third popularity index; and the sum of a, b and c is 1.

Optionally, color pattern used for visual rendering on each positional area is the RGB pattern.

The mapping the calculated popularity score of the shared vehicle as a corresponding color value includes: obtaining a color value of channel R by calculating a product of L and 255; obtaining a color value of channel G by calculating a product of a difference value between 1 and L and 255; and setting a color value of channel B to 0.

Optionally, the following steps are also included: counting N positional areas with the highest popularity score of the shared vehicle; and outputting the N positional areas through a predetermined visual interface.

The present specification also proposes a device for stationing shared vehicles, including: a collection module, configured to collect a geographic position of a user when a shared vehicle is used; a calculation module, configured to calculate a popularity index of the shared vehicle in a positional area corresponding to each collected geographic position, and calculate a popularity score of each positional area based on the popularity index of the shared vehicle; a mapping module, configured to map the calculated popularity score of the shared vehicle as a corresponding color value; and a rendering module, configured to generate a visual chart through visual rendering on each positional area based on the color value, where the visual chart is used to plan areas for stationing the shared vehicle.

Optionally, the collection module is configured to: adopt the geographic position of the user when the shared vehicle is leased; and collect the geographic position of the user when the shared vehicle is returned.

Optionally, the calculation module is configured to: calculate the difference between the quantity of the shared vehicles distributed and the quantity of the shared vehicles leased in each positional area to obtain the first popularity index; calculate the difference between the quantity of the shared vehicles distributed and the quantity of the shared vehicles returned in each positional area to obtain the second popularity index; and calculate the difference between the quantity of the shared vehicles leased and the quantity of the shared vehicles returned in each positional area, and take an absolute value of the difference to obtain the third popularity index.

Optionally, the calculation module is configured to: map the first popularity index, the second popularity index, and the third popularity index to interval [0, 1] separately; and calculate the popularity score of the shared vehicle based on the following equation:

$$L=a*S1+b*S2+c*S3;$$

where L is the popularity score of the shared vehicle; S1 represents the first popularity index mapped to interval [0,1]; S2 represents the second popularity index mapped to interval [0,1]; S3 represents the third popularity index mapped to interval [0,1]; A is the weight value corresponding to the first popularity index; B is the weight value corresponding to the second popularity index; C is the weight value corresponding to the third popularity index; and the sum of a, b and c is 1.

Optionally, the color pattern used for visual rendering on each positional area is the RGB pattern.

The calculation module is further configured to: obtain a color value of channel R by calculating a product of L and 255; obtain a color value of channel G by calculating a product of a difference value between 1 and L and 255; and set a color value of channel B to 0.

Optionally, the calculation module is further configured to: calculating N positional areas with the highest popularity score of the shared vehicle; and output the N positional areas through a predetermined visual interface.

The present specification also proposes an electronic device, including: at least one processor; and at least one memory, configured to store machine executable instructions; where by reading and executing the machine executable instructions stored in the memory corresponding to a control logic controlled by a personnel of a customer service center in rotation control, the processor is enabled to: collect a geographic position of a user when a shared vehicle is used; calculate a popularity index of the shared vehicle in a positional area corresponding to each collected geographic position, and calculate a popularity score of each positional area based on the popularity index of the shared vehicle; map the calculated popularity score of the shared vehicle as a corresponding color value; and generate a visual chart through visual rendering on each positional area based on the color value, where the visual chart is used to plan areas for stationing the shared vehicle.

In the technical solution provided in some implementations of the present specification, the geographical position of the user when using the shared vehicle is collected, the popularity index of the shared vehicle usage in the positional area corresponding to each geographic position collected is calculated, the popularity index of the shared vehicle usage in each positional area is calculated based on the popularity index of the shared vehicle, the calculated popularity score of the shared vehicle usage is mapped as the corresponding color value, and then visual rendering is performed on each positional area based on the obtained color value to generate a visual chart for planning the stationing area.

Because the previous visual charts are obtained by performing visual rendering based on the color values mapped from the popularity of the positional areas corresponding to the geographical position of the user when the shared vehicle is used, the previous visual charts can visually present the popularity of the shared vehicle in each positional area, so that the operator of the shared vehicle can visually observe the change of the popularity of the shared vehicle in each positional area by viewing the previous visual charts, and the operator can plan more accurate stationing area based on the change of the popularity in each positional area when the visual charts are used as visual reference to plan the stationing area.

DESCRIPTION OF IMPLEMENTATIONS

The purpose of the present specification is to propose a technical solution where the positional area corresponding to the geographical position of the shared vehicle daily used by the user is used as the potential stationing area, and then the popularity assessment is performed. The visual rendering is performed on the popularity assessment result to generate a visual chart, which can be used as a visual reference for the operator to plan the stationing area, so as to implement accurate stationing.

During the implementation, the operator of the shared vehicle can collect the geographical position of the user when the shared vehicle is used on a daily basis; for example, the geographic position of the user can be adopted when the shared vehicle is leased; and the geographical position of the user can be adopted when the shared vehicle is returned.

Then based on the practical operation data of the shared vehicle, the popularity index of the shared vehicle in the positional area corresponding to each collected geographic position can be calculated separately.

For example, the previous popularity index of the shared vehicles can include the difference between the quantity of the shared vehicles distributed and the quantity of the shared vehicles leased in each positional area, the difference between the quantity of the shared vehicles distributed and the quantity of the shared vehicles returned in each positional area, and the difference between the quantity of the shared vehicles leased and the quantity of the shared vehicles returned in each positional area, which can reflect the index of the supply-demand relationship in each positional area.

Further, based on the calculated popularity index of the shared vehicle, the popularity score of the shared vehicle in each positional area can be calculated by using the predetermined algorithm, and the calculated popularity score is mapped as a color value.

For example, when the color pattern used in visual rendering is the RGB pattern, the previous popularity score can be mapped by using a specific mapping algorithm, and the color values of channel R, channel G and channel B can be converted based on the popularity score.

Finally, visual rendering on each positional area is performed to generate a visual chart based on the obtained color values, and the generated visual chart is output to the operator's administrator, and the administrator can use the visual chart as a visual reference to plan the stationing area of the shared vehicles in following steps.

In the previous technical solution, because the previous visual charts are obtained through visual rendering based on the color values mapped from the positional areas corresponding to the geographical position of the user when the shared vehicle is used, the previous visual charts can visually present the popularity of the shared vehicle in each positional area, so that the operator of the shared vehicle can visually observe the change in the popularity of the shared vehicle in each positional area by viewing the previous visual charts, thereby enabling the operator to plan more accurate stationing areas based on the change in the popularity of each positional area when the visual chart is used as a visual reference to plan the stationing area.

The following describes the present specification by using the implementations and with reference to the specific application scenarios.

Figure 1:
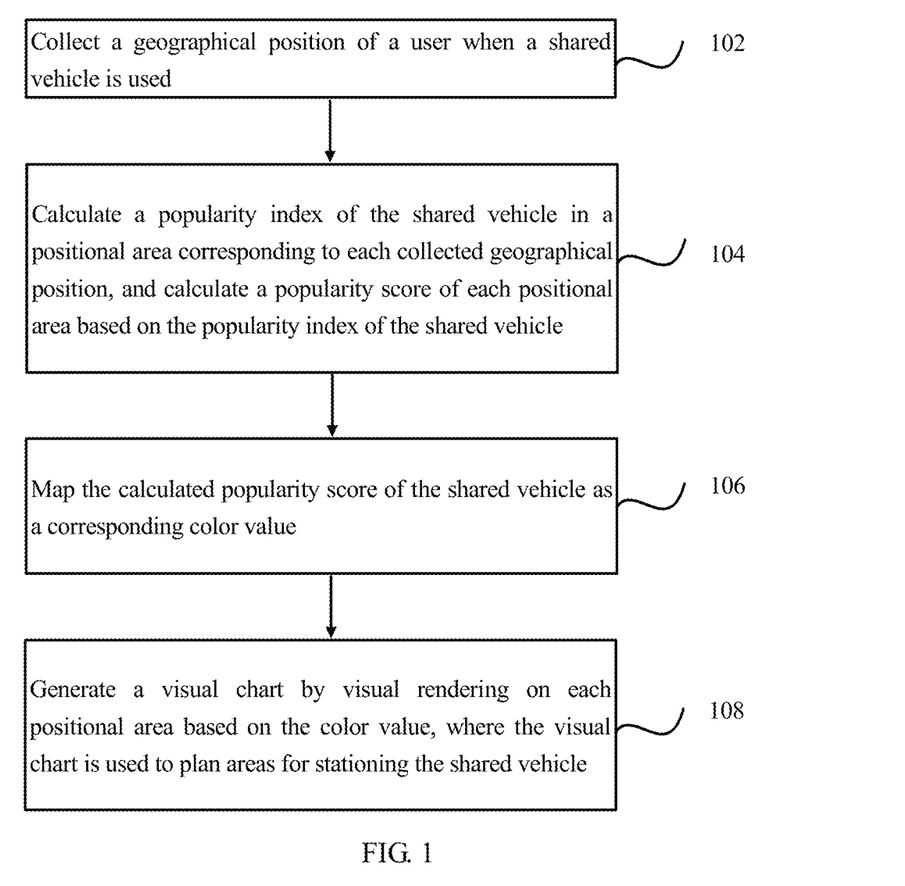
FIG. 1 is a flowchart illustrating the method for stationing shared vehicles, according to an implementation of the present specification.

FIG. 1 illustrates a method for stationing shared vehicles according to an implementation of the present specification. The following steps are performed:

Step 102: Collect a geographic position of a user when the shared vehicle is used.

Step 104: Calculate a popularity index of the shared vehicle in a positional area corresponding to each collected geographic position, and calculate a popularity score of each positional area based on the popularity index of the shared vehicle.

Step 106: Map the calculated popularity score of the shared vehicle as a corresponding color value.

Step 108: Generate a visual chart through visual rendering on each positional area based on the color value, where the visual chart is used to plan areas for stationing the shared vehicle.

The previous shared vehicle can specifically include a vehicle that is distributed by an operator in an off-line position for discovery and rental; for example, shared bicycles.

The previous stationing area refers to the area planned by the operator of shared vehicles and is used for stationing shared vehicles; for example, in practice, operators can prioritize stationing areas for positional areas where there is a high demand for shared vehicles.

The previous popularity index use of the shared vehicles can include indexes that reflect a supply-demand relationship of shared vehicles in each positional area.

For example, in an implementation, operational indicators such as the quantity of the distributed, leased, and returned shared vehicles in each positional area can be used to represent the popularity of the shared vehicles in each positional area. In this case, the previous popularity index can include the difference between the quantity of the shared vehicles distributed and the quantity of the shared vehicles leased in each positional area, the difference between the quantity of the shared vehicles distributed and the quantity of the shared vehicles returned in each positional area, and the difference between the quantity of the shared vehicles leased and the quantity of the shared vehicles returned in each positional area.

The popularity score of the shared vehicle is calculated based on the previous popularity index and can present the popularity score of the shared vehicle in each positional area.

For example, in an implementation, the previous popularity indexes which include the difference between the quantity of the shared vehicles distributed and the quantity of the shared vehicles leased in each positional area, the difference between the quantity of the shared vehicles distributed and the quantity of the shared vehicles returned in each positional area, and the difference between the quantity of the shared vehicles leased and the quantity of the shared vehicles returned in each positional area are used as examples, in this case, the operator of the shared vehicle can set a corresponding weight value for each previous index based on the practical business demands, and perform weighted calculation on the previous indexes based on the weight value to obtain a final popularity score.

Figure 2:
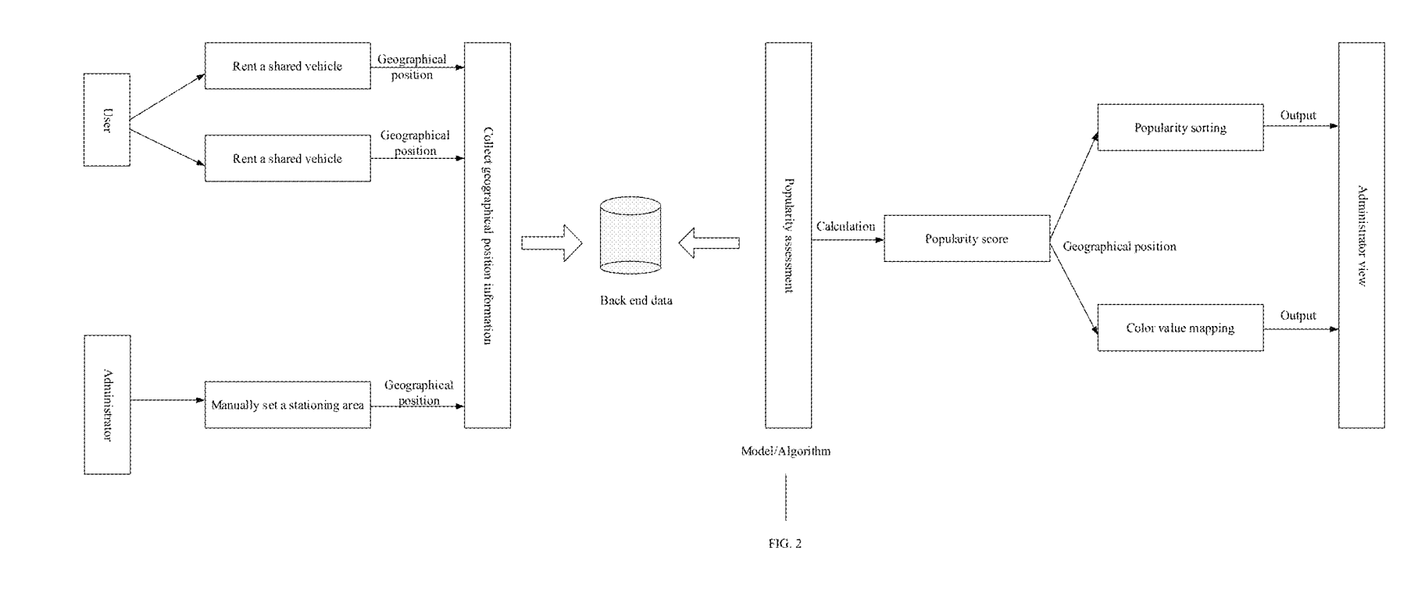
FIG. 2 is an overall architectural diagram illustrating the areas for stationing the shared vehicles, according to an implementation of the present specification.

FIG. 2 is a diagram showing the overall structure that the operator plans the areas for stationing the shared vehicles.

In the present specification, users can use clients on a daily basis to communicate with the server of the operator of the shared vehicle, and lease online and use the shared vehicle delivered offline by the operator. For example, the shared vehicle being a shared bicycle is used as an example. The user can use the client to scan the predetermined information such as the two-dimensional code on the shared bicycle offline and initiate an online unlock to the server to complete the rental operation of the shared bicycle.

The server of the operator at the back ends can collect and record the user's geographic position information (such as geographic position coordinates) when the shared vehicle is used as basic data for subsequent planning for the positional area of the shared vehicle.

As shown in FIG. 2, in the practical application, the user's geographic position information when the shared vehicle is used can include the user's geographic position information when the shared vehicle is leased offline and the user's geographic position information when the shared vehicle is planned offline.

In the implementation, the operator can introduce a workflow to collect the user's geographic position information in the process of leasing and returning the shared vehicle.

For example, the shared vehicle being a shared bicycle is still used as an example. When the user initiates an online unlock to the server by using the client offline to scan the predetermined information offline such as the two-dimensional code on the shared car, the server can actively collect the current geographic position coordinates of the user from the client in addition to creating the corresponding lease order at the back end and returning the created order information to the client, or the client can actively reports the current geographic position coordinates of the user to the server after receiving the order information returned by the server, so as to collect the geographic position information of the user when the sharing car is leased. Accordingly, when a user returns a shared bicycle offline, the server can actively collect the current geographic position coordinates of the user from the client, or the client can actively report the current geographic position coordinates of the user to the server to collect the geographic position information of the user when the shared bicycle is planned.

For the geographic position information collected by the server when the shared vehicle is used, the server can initially process the geographic position information at the back end and determine the positional area corresponding to the collected geographic position, and record the positional area as a potential stationing area at the back end database.

The positional areas corresponding to the collected geographic positions can be some areas planned in advance by the operator's administrator or the positional areas dynamically determined by the operator's server based on the collected geographic positions.

For example, in a shown implementation, operators' administrators can plan several potential stationing areas in advance with reference to the map data before planning stationing areas of the shared vehicles; for example, areas needed for stationing shared vehicles can be pre-divided into several sub-areas based on map data. After collecting the geographic position information of the user when the shared vehicle is used, the server can find the sub-area where the geographic position falls into, and determines the sub-area as the positional area corresponding to the geographic position.

In another implementation, without planning the potential stationing area in advance. After collecting the geographic position information of the user when the shared vehicle is used, the operator's administrator can automatically determine area of a certain range centered on the geographic position as the positional area corresponding to the geographic position, and further determine as the potential stationing area.

Still referring to FIG. 2, in practice, in addition to collecting the geographic position information of users as basic data for subsequent planning for stationing areas of the shared vehicles when the shared vehicles is leased and returned, the server can also collect the geographic position information manually set by the operator's administrators as the positional area for stationing areas to expand the previous basic data.

In this case, in addition to recording the positional area corresponding to the geographical position of the leased and the returned shared vehicles as potential stationing areas at the back end database, the server can record the positional area that is manually set as the stationing area by the operator's administrator based on experience at the back end database.

Still referring to FIG. 2, for positional areas that are recorded at the back end database as potential stationing areas, the server can assess and calculate the popularity of the shared vehicles in each positional area based on the mounted popularity assessment models or corresponding popularity assessment algorithms to obtain the popularity score of shared vehicles in each positional area.

When assessing and calculating the popularity of the shared vehicle in each positional area, the server can first calculate the popularity index of the shared vehicle in each positional area, and further calculate the popularity score of the shared vehicle in each positional area based on the calculated popularity index.

In an implementation, the previous popularity indexes can include the indexes:

Index 1:

The difference between the quantity of the shared vehicles distributed and the quantity of the shared vehicles leased in each positional area. The value of this index is inversely proportional to the popularity of the shared vehicle in the positional area. A smaller value of this index indicates a larger quantity of the shared vehicle in the positional area that are rent out, and a higher popularity of the shared vehicle in the positional area.

Index 2:

The difference between the quantity of the shared vehicles distributed and the quantity of the shared vehicles returned in each positional area. The value of this index is also inversely proportional to the popularity of the shared vehicle in the positional area. The larger the value of this index indicates that the lower the returned quantity of the shared vehicle in the positional area, and the lower the popularity of the shared vehicle in the positional area.

Index 3:

The difference between the quantity of the shared vehicles leased and the quantity of the shared vehicles returned in each positional area. The value of this index is also inversely proportional to the popularity of the shared vehicle in the positional area. The larger the value of this index indicates that the greater the gap between the lent quantity and the returned quantity of the shared vehicle in the positional area, and the supply-demand relationship of the shared vehicle in the positional area is unbalanced.

In this case, the server can first count, based on the operational data collected at the back end, operational indexes such as the quantity of the shared vehicles distributed, leased and returned in each potential stationing area.

For example, in the implementation, the quantity of the shared vehicles distributed in potential stationing areas can be counted as the quantity of the shared vehicles distributed in the area based on the geographic position coordinates reported by the shared vehicles distributed offline; the quantity of shared bicycles that have been leased and returned within each potential stationing area can be counted based on the geographic coordinates reported by the users when leasing and returning the shared vehicles to obtain the quantity of leased and returned shared vehicles in the area.

After the quantity of the distributed, leased and returned shared vehicles in each potential stationing area is counted, the difference value between the quantity of distributed and leased can further be calculated to obtain the previous index 1. The difference between the quantity of distributed shared vehicles and the quantity of returned shared vehicles can be calculated to obtain the previous index 2. The difference between the quantity of leased and returned can be calculated and the absolute value of the difference (the difference between the quantity of distributed shared vehicles and the quantity of returned shared vehicles can be negative) can be taken to obtain the previous index 3.

In an implementation, after calculating the previous popularity index 1, index 2 and index 3 of the shared vehicle in each positional area, the server can first normalize the previous popularity index and map the previous popularity index to interval [0, 1].

For example, in the implementation, the previous indexes can be normalized by using the sigmod function, and the index 1, index 2 and index 3 can be mapped to intervals [0,1]:

$$S1=1/(1+e^m)$$

$$S1=1/(1+e^n)$$

$$S1=1/(1+e^g)$$

In the previous equation, m indicates the previous index 1, and S1 indicates index 1 after mapping to interval[0,1]. n indicates the previous index 2, and S2 indicates index 2 mapped to interval [0,1]. g indicates the previous index 3, and S3 indicates the index 3 mapped to interval [0,1].

In an implementation, the operator's administrator can separately set a corresponding weight value for the previous index 1, index 2 and index 3 in advance, and the server weighs the index 1, index 2 and index 3 after mapping to interval [0,1] based on the following equation to obtain the final popularity score for each positional area:

$$L=a*S1+b*S2+c*S3;$$

In the previous equation, L is the popularity score of the shared vehicle; a is the weight value corresponding to the first popularity index; b is the weight value corresponding to the second popularity index; c is the weight value corresponding to the third popularity index; and the sum of a, b and c is 1.

It is worthwhile to note that the previous weight values a, b and c are not limited in the present specification and can be flexibly set and adjusted by the administrator of the operator based on the practical business demands.

For example, in some implementation, a, b, and c can be set to the same value, so that the eventually obtained L value is a weighted value obtained by comprehensively considering the previous index 1, index 2, and index 3, so that the supply-demand relationship of each positional area can be more accurately characterized.

Still referring to FIG. 2, after further calculating the popularity scores of the shared vehicles in each positional area, the server can further map the popularity score as a color value, and perform visual rendering on each positional area based on the color value obtained by mapping.

It is worthwhile to note that the color pattern used for visual rendering on each positional area based on the obtained color value is not particularly limited in the present specification.

In an implementation, the adopted color pattern being the RGB pattern is used as an example. In the RGB color pattern, R represents the red channel, G represents the green channel, B represents the blue channel, and channels R, and B have a value range [0,255].

In this case, because the color values of channels R, G, and B are in the range [0,255], and the popularity score L of each positional area calculated by the server is a value in range [0,1], the color values of channel R and channel G can be calculated by using the following equation:

$$R=L*255$$

$$G=(1-L)*255$$

It is worthwhile to note that, because human eyes are usually insensitive to blue, in this implementation, the color value of channel B can be directly set to 0.

Of course, the adopted color pattern is only used as an example of the RGB pattern. Apparently, other color patterns such the CMYK pattern and the HSB pattern can also be used in the implementation. Details are omitted in the present specification.

Still referring to FIG. 2, when mapping the calculated popularity score of each positional area as a color in the way described above, the server can separately perform visual rendering on each positional area based on the color obtained to generate a visual chart, and output the generated visual chart to the administrator through the visual interface in the administrator view, so that the administrator can refer to the above visual chart and plan those positional areas with higher popularity as stationing areas.

Based on the color values of each positional area, the process that visual rendering is performed on each positional area to generate a visual chart is not described in detail in the present specification. A person skilled in the art can refer to the related technology records when implementing the technical solution in the present specification.

For example, in an implementation, the previous visual chart can be a thermodynamic diagram, and the server can include a preconfigured thermodynamic diagram rendering engine and use the popularity score of each positional area as input data, to perform visual rendering processing to generate the thermodynamic diagram.

Still referring to FIG. 2, in the present specification, in addition to outputting the generated visual charts to administrators through the administrator view, the server can calculate and sort the popularity score of each positional area, and count the N positional areas with the highest popularity scores. The N positional areas can be output to the administrators as recommendations in the administrator view through the visual interface to help administrators plan for more accurate stationing areas with the highest popularity.

Of course, in the practical application, when counting the N positional areas with the highest popularity score, the server can also automatically set the N positional areas as the stationing areas at the back end instead of planning stationing areas manually by administrators, which is not limited in the present specification.

In technical solution provided in some implementations of the present specification, the geographical position of the user when the shared vehicle is used is collected, the popularity index of the shared in the positional area corresponding to each geographic position collected is calculated, the popularity score of the shared vehicle in each positional area is calculated based on the popularity index of the shared vehicle, the calculated popularity score of the shared vehicle is mapped as the corresponding color value, and then visual rendering is performed on each positional area based on the obtained color value to generate a visual chart for planning the stationing area.

In the previous implementations, because the previous visual charts are obtained by performing visual rendering based on the color values mapped from the popularity of the positional areas corresponding to the geographical position of the user when the shared vehicle is used, and the popularity of the shared vehicle in the different positional areas is usually different, the previous visual charts can visually present the popularity of the shared vehicle in each positional area, so that the operator of the shared vehicle can visually observe the change of the popularity of the shared vehicle in each positional area by viewing the previous visual charts, so that the operator can plan the more accurate stationing area based on the change of the popularity in each positional area when the visual charts are used as visual reference to plan the stationing area.

For example, in conventional stationing planning, the stationing area is usually manually set by administrators based on intuition and experience, which can be unbalanced in the supply-demand relationship. The problems that there are stationing areas the supply exceeding the demand or there are stationing areas the demand exceeding the supply both exist. The problem that inaccurate stationing results in users with shared vehicle leasing demands far away from the stationing area, and further results in inconvenience for users. If the administrators plan the stationing area with reference to the previous visual charts, those positional areas with higher popularity can be preferentially set as the stationing areas, thereby ensuring a more balanced supply-demand relationship in the planned stationing areas.

Figure 3:
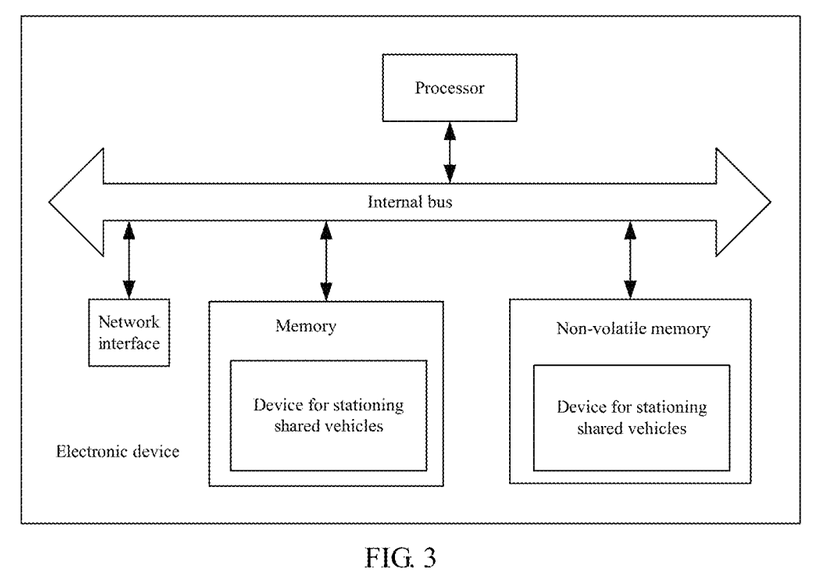
FIG. 3 is a diagram illustrating the hardware structure involved in the electronic device carrying the device for stationing shared vehicles, according to an implementation of the present specification.

Corresponding to the previous method implementations, the present specification further provides an implementation of a device for stationing shared vehicles. The implementations of the device for stationing shared vehicles in the present specification can be applied to the electronic devices. The device implementations can be implemented by using the software, or can be implemented by using the hardware or a combination of the software and the hardware. The software implementation is used as an example. As a logical device, the software is developed when the corresponding computer program instructions in the non-volatile memory are read into the memory to perform by the processor of the electronic device. In terms of the hardware, as shown in FIG. 3, FIG. 3 is a diagram illustrating the hardware structure of the electronic device where the device for stationing shared vehicles is located. In addition to the processor, the memory, the network interface, and the non-volatile memory shown in FIG. 3, the electronic device in which the device is located in this implementation can generally include other hardware according to the practical function of the electronic device. Details are omitted here for simplicity.

Figure 4:
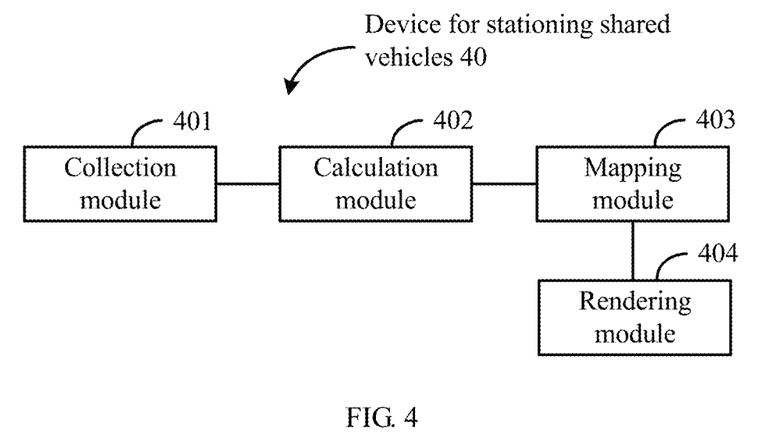
FIG. 4 is a logical block diagram illustrating the device for stationing shared vehicles, according to an implementation of the present specification.

FIG. 4 is a block diagram illustrating the device for stationing shared vehicles according to an example implementation of the present specification.

Referring to FIG. 3, the device for stationing shared vehicles 40 can be applied to the electronic device shown in FIG. 3, and includes a collection module 401, a calculation module 402, a mapping module 403, and a rendering module 404.

The collection module 401 is configured to collect the geographical position of the user when the shared vehicle is used.

The calculation module 402 is configured to calculate the popularity index of the shared vehicle in the positional area corresponding to each collected geographic position, and calculate the popularity score of each positional area based on the popularity index of the shared vehicle.

The mapping module 403 is configured to map the calculated popularity score of the shared vehicle to the corresponding color value.

The rendering module 404 is configured to generate the visual chart through visual rendering on each positional area based on the color value, where the visual chart is used to plan the areas for stationing the shared vehicles.

In this implementation, the collection module 401 is configured to: adopt the geographic position of the user when the shared vehicle is leased; and collect the geographic position of the user when the shared vehicle is returned.

In this implementation, the calculation module 402 is configured to: calculate the difference between the quantity of the shared vehicles distributed and the quantity of the shared vehicles leased in each positional area to obtain the first popularity index; calculate the difference between the quantity of the shared vehicles distributed and the quantity of the shared vehicles returned in each positional area to obtain the second popularity index; and calculate the difference between the quantity of the shared vehicles leased and the quantity of the shared vehicles returned in each positional area, and take an absolute value of the difference to obtain the third popularity index.

In this implementation, the calculation module 402 is configured to: map the first popularity index, the second popularity index, and the third popularity index to interval [0, 1] separately; and calculate the popularity score of the shared vehicle based on the following equation:

$$L=a*S1+b*S2+c*S3;$$

where L is the popularity score of the shared vehicle; S1 represents the first popularity index mapped to interval [0,1]; S2 represents the second popularity index mapped to interval [0,1]; S3 represents the third popularity index mapped to interval [0,1]; a is the weight value corresponding to the first popularity index; b is the weight value corresponding to the second popularity index; c is the weight value corresponding to the third popularity index; and the sum of a, b and c is 1.

In this implementation, the color pattern used for visual rendering on each positional area is the RGB pattern.

The calculation module 402 is further configured to: obtain a color value of channel R by calculating a product of L and 255; obtain a color value of channel G by calculating a product of a difference value between 1 and L and 255; and set a color value of channel B to 0.

In this implementation, the calculation module 402 is further configured to: calculate N positional areas with the highest popularity score of the shared vehicle; and output the N positional areas through a predetermined visual interface.

For the detailed implementation process of the functions and purposes of the modules in the device, references can be made to the implementation process of the corresponding steps in the method, and details are omitted here for simplicity.

Because the device implementation basically corresponds to the method implementation, for the related parts, references can be made to the description of the method implementation. The described device implementations are merely examples, where the units described as separate parts can or cannot be physically separate, and parts displayed as units can or cannot be physical units, can be located in one place, or can be distributed on a plurality of network units. Based on the practical demands, some or all of these modules can be selected to implement the purpose of the present specification. A person of ordinary skill in the art can understand and implement without paying creative work.

The system, device, modules or units illustrated in the previous implementations can be implemented by using a computer chip or entity, or can be implemented by using a product with a specific function. A typical implementation device is a computer in the form of a personal computer, a laptop computer, a cellular phone, a camera phone, a smart phone, a personal digital assistant, a media player, a navigation device, an e-mail transceiver, a game console, a tablet computer, a wearable device, or any combination of several of these devices.

Corresponding to the previous method implementations, the present specification further provides an implementation of an electronic device. The electronic device includes a processor and a memory configured to store a machine executable instruction; the processor and memory are usually connected to each other through an internal bus. In other possible implementations, the device can also include an external interface to communicate with other devices or components.

In this implementation, by reading and executing the machine executable instructions stored in the memory corresponding to the control logic of the planning for stationing the shared vehicle, the processor is enabled to: collect a geographic position of a user when a shared vehicle is used; calculate a popularity index of the shared vehicle in a positional area corresponding to each collected geographic position, and calculate a popularity score of each positional area based on the popularity index of the shared vehicle; map the calculated popularity score of the shared vehicle as a corresponding color value; and generate a visual chart through visual rendering on each positional area based on the color value, where the visual chart is used to plan areas for stationing the shared vehicle.

In this implementation, by reading and executing the machine executable instructions stored in the memory corresponding to the control logic of the planning for stationing the shared vehicle, the processor is further enabled to: adopt the geographic position of the user when the shared vehicle is leased; and collect the geographic position of the user when the shared vehicle is returned.

In this implementation, by reading and executing the machine executable instructions stored in the memory corresponding to the control logic of the planning for stationing the shared vehicle, the processor is further enabled to: calculate the difference between the quantity of the shared vehicles distributed and the quantity of the shared vehicles leased in each positional area to obtain the first popularity index; calculate the difference between the quantity of the shared vehicles distributed and the quantity of the shared vehicles returned in each positional area to obtain the second popularity index; and calculate the difference between the quantity of the shared vehicles leased and the quantity of the shared vehicles returned in each positional area, and take an absolute value of the difference to obtain the third popularity index.

In this implementation, by reading and executing the machine executable instructions stored in the memory corresponding to the control logic of the planning for stationing the shared vehicle, the processor is further enabled to: map the first popularity index, the second popularity index, and the third popularity index to interval [0, 1] separately; and calculate the popularity score of the shared vehicle based on the following equation:

$$L=a*S1+b*S2+c*S3;$$

where L is the popularity score of the shared vehicle; S1 represents the first popularity index mapped to interval [0,1]; S2 represents the second popularity index mapped to interval [0,1]; S3 represents the third popularity index mapped to interval [0,1]; a is the weight value corresponding to the first popularity index; b is the weight value corresponding to the second popularity index; c is the weight value corresponding to the third popularity index; and the sum of a, b and c is 1.

In this implementation, the color pattern used for visual rendering of each positional area is an RGB pattern. By reading and executing the machine executable instructions stored in the memory corresponding to the control logic of the planning for stationing the shared vehicle, the processor is further enabled to: obtain a color value of channel R by calculating a product of L and 255; obtain a color value of channel G by calculating a product of a difference value between 1 and L and 255; and set a color value of channel B to 0.

In this implementation, by reading and executing the machine executable instructions stored in the memory corresponding to the control logic of the planning for stationing the shared vehicle, the processor is further enabled to: calculate N positional areas with the highest popularity score of the shared vehicle; and output the N positional areas through a predetermined visual interface.

The specific implementations of the present specification are described above. Other implementations are within the scope of the appended claims. In some cases, the actions or steps described in the claims can be performed in an order different from that in the implementations to achieve expected results. In addition, the process described in the accompanying drawings does not necessarily require the particular sequence or the sequential sequence shown to achieve the expected results. In some implementations, multi-task processing and parallel processing are also possible or can be advantageous.

The implementations in the present specification are described in a progressive way, the same or similar parts between the implementations are referred to each other, and each implementation focuses on differences from other implementations. In particular, because the device, the system, the electronic device, and the non-volatile computer storage medium implementation are basically similar to the method implementation, the description is relatively simple. For the related parts, references can be made to the description of the method implementation.

It can be learned from the previous descriptions of implementations that a person skilled in the art can clearly understand that the implementations of the present specification can be implemented by software plus a necessary universal hardware platform. Based on such an understanding, the technical solutions of the implementations of the present specification essentially or the contributions to the prior art can be embodied in the form of a software product. The computer software product can be stored in the storage medium, such as the ROM/RAM, the magnetic disk and the optical disc, including several instructions for enabling a computer device (which can be a personal computer, a server, or a network device) to execute the methods described in the implementations or parts of the implementations of the present specification.

The system, device, modules or units illustrated in the previous implementations can be implemented by using a computer chip or entity, or can be implemented by using a product with some function. A typical implementation device is a computer in the form of a personal computer, a laptop computer, a cellular phone, a camera phone, a smart phone, a personal digital assistant, a media player, a navigation device, an e-mail transceiver, a game console, a tablet computer, a wearable device, or any combination of several of these devices.

The implementations in the present specification are described in a progressive way, the same or similar parts between the implementations are referred to each other, and each implementation focuses on differences from other implementations. In particular, because the device implementation is basically similar to the method implementation, the description is relatively simple. For the related parts, references can be made to the description of the method implementation. The described device implementations are merely examples, the modules described as separate parts can or cannot be physically separate, and the functions of each module can be implemented in the same or the plurality of software and/or hardware when the implementation solutions of the present specification are implemented. Based on the practical demands, some or all of the modules can be selected to achieve the objectives of the present implementation. A person of ordinary skill in the art can understand and implement without paying creative work.

The previous descriptions are merely specific implementations of the implementations of the present specification. It is worthwhile to note that a person of ordinary skill in the art can make some improvements and embellishes without departing from the principles of the implementations of the present specification. These improvements and embellishes shall also be considered as the protection scope of the implementations of the present specification.

What is claimed is:

1. A computer-implemented method performed by one or more computers, comprising:
    collecting, by the one or more computers, information about respective geographic positions of users using shared vehicles;
    determining, by the one or more computers and for each one of the respective geographic positions, popularity indexes of the shared vehicles in an area corresponding to the geographic position comprising
        determining a first popularity index by calculating a difference between a quantity of the shared vehicles that are stationed and a quantity of the shared vehicles that are leased out in the area corresponding to the geographic position,
        determining a second popularity index by calculating a difference between the quantity of the shared vehicles that are stationed and a quantity of the shared vehicles that are returned in the area corresponding to the geographic position, and
        determining a third popularity index by calculating a difference between the quantity of the shared vehicles that are leased out and the quantity of the shared vehicles that are returned in the area corresponding to the geographic position, and taking an absolute value of the difference;

determining, by the one or more computers and for each one of the respective geographic positions and based on the popularity indexes, a popularity score of the shared vehicles within the area corresponding to the geographic position;

mapping, by the one or more computers, the popularity scores to corresponding color values;

generating, by the one or more computers, a dynamic presentation of the areas with visual attributes reflecting a change in the popularity scores of the shared vehicles within the areas, wherein generating the dynamic presentation comprises automatically selecting a subset of the respective geographic positions associated with the highest popularity scores, generating the dynamic presentation of the subset of the respective geographic positions, and rendering the dynamic presentation in accordance with the color values to generate the visual attributes for the subset of the respective geographic positions, wherein the visual attributes comprise color attributes where a red color indicates a high popularity score and where a green color indicates a low popularity score;

presenting, by the one or more computers and on a graphical user interface (GUI) of a display device, the dynamic presentation to an operator stationing the shared vehicles at the respective geographic positions; and receiving, responsive to the dynamic presentation and based on operator input, information specifying one or more of the respective geographic positions in the subset of geographic positions as stationing areas.

2. The computer-implemented method according to claim 1, wherein collecting information about respective geographic positions of users using shared vehicles comprises:

collecting information about respective geographic positions of users when checking out the shared vehicles; and collecting information about respective geographic positions of users when returning the shared vehicles.

3. The computer-implemented method according to claim 1, wherein determining the popularity score of the shared vehicles within the area corresponding to the geographic position comprises, for each one of the respective geographic positions:

mapping the first popularity index, the second popularity index, and the third popularity index to respective intervals of [0, 1]; and calculating the popularity score of the shared vehicle based on the following equation:

$$L = a^* S1 + b^* S2 + c^* S3,$$

wherein L is the popularity score of the shared vehicle, S1 represents the first popularity index mapped to interval [0,1], S2 represents the second popularity index mapped to interval [0,1], S3 represents the third popularity index mapped to interval [0,1], a is a weighting factor corresponding to the first popularity index, b is a weighting factor corresponding to the second popularity index, c is a weighting factor corresponding to the third popularity index, and a sum of a, b and c is 1.

4. The computer-implemented method according to claim 3, wherein rendering the presentation in accordance with the color values comprises using RGB rendering; and mapping the popularity scores to corresponding color values comprises:

determining a color value of channel R by calculating a product of L and 255;

determining a color value of channel G by calculating a product of (i) a difference between 1 and L and (ii) 255; and setting a color value of channel B to 0.

5. The computer-implemented method according to claim 1, further comprising:

determining N areas having highest popularity scores of the shared vehicles within the areas, wherein N is a positive integer; and outputting information about the N areas through the graphic user interface.

6. The computer-implemented method according to claim 1, wherein collecting the information about respective geographic positions of users using shared vehicles comprises:

receiving user-specified information specifying the area corresponding to each one of the respective geographic positions.

7. The computer-implemented method according to claim 1, wherein collecting the information about respective geographic positions of users using shared vehicles comprises:

automatically determining, as the area corresponding to each one of the respective geographic positions, an area that is of a certain range centered on the respective geographic position.

8. A non-transitory, computer-readable medium storing one or more instructions executable by a computer system to perform operations comprising:

collecting information about respective geographic positions of users using shared vehicles;

determining, for each one of the respective geographic positions, popularity indexes of the shared vehicles in an area corresponding to the geographic position comprising determining a first popularity index by calculating a difference between a quantity of the shared vehicles that are stationed and a quantity of the shared vehicles that are leased out in the area corresponding to the geographic position, determining a second popularity index by calculating a difference between the quantity of the shared vehicles that are stationed and a quantity of the shared vehicles that are returned in the area corresponding to the geographic position, and determining a third popularity index by calculating a difference between the quantity of the shared vehicles that are leased out and the quantity of the shared vehicles that are returned in the area corresponding to the geographic position, and taking an absolute value of the difference;

determining, for each one of the respective geographic positions and based on the popularity indexes, a popularity score of the shared vehicles within the area corresponding to the geographic position;

mapping the popularity scores to corresponding color values;

generating a dynamic presentation of the areas with visual attributes reflecting a change in the popularity scores of the shared vehicles within the areas, wherein generating the dynamic presentation comprises automatically selecting a subset of the respective geographic positions associated with the highest popularity scores, generating the dynamic presentation of the subset of the respective geographic positions, and rendering the dynamic presentation in accordance with the color values to generate the visual attributes for the subset of the respective geographic positions, wherein the visual attributes comprise color attributes where a red color indicates a high popularity score and where a green color indicates a low popularity score;

presenting, on a graphical user interface (GUI) of a display device, the dynamic presentation to an operator stationing the shared vehicles at the respective geographic positions; and receiving, responsive to the dynamic presentation and based on operator input, information specifying one or more of the respective geographic positions in the subset of geographic positions as stationing areas.

9. The non-transitory, computer-readable medium according to claim 8, wherein collecting information about respective geographic positions of users using shared vehicles comprises:

collecting information about respective geographic positions of users when checking out the shared vehicles; and collecting information about respective geographic positions of users when returning the shared vehicles.

10. The non-transitory, computer-readable medium according to claim 8, wherein determining the popularity score of the shared vehicles within the area corresponding to the geographic position comprises, for each one of the respective geographic positions:

mapping the first popularity index, the second popularity index, and the third popularity index to respective intervals of [0, 1]; and calculating the popularity score of the shared vehicle based on the following equation:

$$L = a*S1 + b*S2 + c*S3,$$

wherein L is the popularity score of the shared vehicle, S1 represents the first popularity index mapped to interval [0,1], S2 represents the second popularity index mapped to interval [0,1], S3 represents the third popularity index mapped to interval [0,1], a is a weighting factor corresponding to the first popularity index, b is a weighting factor corresponding to the second popularity index, c is a weighting factor corresponding to the third popularity index, and a sum of a, b and c is 1.

11. The non-transitory, computer-readable medium according to claim 10, wherein rendering the presentation in accordance with the color values comprises using RGB rendering; and mapping the popularity scores to corresponding color values comprises:
determining a color value of channel R by calculating a product of L and 255;
determining a color value of channel G by calculating a product of (i) a difference between 1 and L and (ii) 255; and
setting a color value of channel B to 0.

12. The non-transitory, computer-readable medium according to claim 8, wherein the operations further comprise:

determining N areas having highest popularity scores of the shared vehicles within the areas, wherein N is a positive integer; and outputting information about the N areas through the graphic user interface.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

collecting information about respective geographic positions of users using shared vehicles;

determining, for each one of the respective geographic positions, popularity indexes of the shared vehicles in an area corresponding to the geographic position comprising
determining a first popularity index by calculating a difference between a quantity of the shared vehicles that are stationed and a quantity of the shared vehicles that are leased out in the area corresponding to the geographic position,
determining a second popularity index by calculating a difference between the quantity of the shared vehicles that are stationed and a quantity of the shared vehicles that are returned in the area corresponding to the geographic position, and
determining a third popularity index by calculating a difference between the quantity of the shared vehicles that are leased out and the quantity of the shared vehicles that are returned in the area corresponding to the geographic position, and taking an absolute value of the difference;

determining, for each one of the respective geographic positions and based on the popularity indexes, a popularity score of the shared vehicles within the area corresponding to the geographic position;

mapping the popularity scores to corresponding color values;

generating a dynamic presentation of the areas with visual attributes reflecting a change in the popularity scores of the shared vehicles within the areas, wherein generating the dynamic presentation comprises
automatically selecting a subset of the respective geographic positions associated with the highest popularity scores,
generating the dynamic presentation of the subset of the respective geographic positions, and
rendering the dynamic presentation in accordance with the color values to generate the visual attributes for the subset of the respective geographic positions, wherein the visual attributes comprise color attributes where a red color indicates a high popularity score and where a green color indicates a low popularity score;

presenting, on a graphical user interface (GUI) of a display device, the dynamic presentation to an operator stationing the shared vehicles at the respective geographic positions; and receiving, responsive to the dynamic presentation and based on operator input, information specifying one or more of the respective geographic positions in the subset of geographic positions as stationing areas.

14. The computer-implemented system according to claim 13, wherein collecting information about respective geographic positions of users using shared vehicles comprises:

collecting information about respective geographic positions of users when checking out the shared vehicles; and collecting information about respective geographic positions of users when returning the shared vehicles.

15. The computer-implemented system according to claim 13, wherein determining the popularity score of the shared vehicles within the area corresponding to the geographic position comprises, for each one of the respective geographic positions:
mapping the first popularity index, the second popularity index, and the third popularity index to respective intervals of [0, 1]; and
calculating the popularity score of the shared vehicle based on the following equation:

$$L = a * S1 + b * S2 + c * S3,$$

wherein L is the popularity score of the shared vehicle, S1 represents the first popularity index mapped to interval [0,1], S2 represents the second popularity index mapped to interval [0,1], S3 represents the third popularity index mapped to interval [0,1], a is a weighting factor corresponding to the first popularity index, b is a weighting factor corresponding to the second popularity index, c is a weighting factor corresponding to the third popularity index, and a sum of a, b and c is 1.

16. The computer-implemented system according to claim 15, wherein rendering the presentation in accordance with the color values comprises using RGB rendering; and
mapping the popularity scores to corresponding color values comprises:
determining a color value of channel R by calculating a product of L and 255;
determining a color value of channel G by calculating a product of (i) a difference between 1 and L and (ii) 255; and
setting a color value of channel B to 0.

17. The computer-implemented system according to claim 13, wherein the operations further comprise:
determining N areas having highest popularity scores of the shared vehicles within the areas, wherein N is a positive integer; and
outputting information about the N areas through the graphic user interface.

* * * * *